United States Patent [19]

Kobayashi et al.

[11] Patent Number: 5,614,289
[45] Date of Patent: Mar. 25, 1997

[54] ID CARD

[75] Inventors: Toru Kobayashi; Koichi Nagayasu, both of Hino, Japan

[73] Assignee: Konica Corporation, Tokyo, Japan

[21] Appl. No.: 295,246

[22] Filed: Aug. 24, 1994

[30] Foreign Application Priority Data

Aug. 30, 1993 [JP] Japan .................................. 5-213683

[51] Int. Cl.$^6$ ........................................ B32B 3/00
[52] U.S. Cl. .................. 428/195; 428/318.4; 428/319.3; 428/411.1; 428/480; 428/483; 428/500; 428/522; 428/689; 428/704
[58] Field of Search ............................. 503/227; 428/195, 428/318.4, 319.3, 480, 483, 913, 914, 411.1, 500, 522, 689, 704; 156/230, 240, 361, 182

[56] References Cited

U.S. PATENT DOCUMENTS

| | | | |
|---|---|---|---|
| 4,923,848 | 5/1990 | Akada et al. | 503/227 |
| 5,246,910 | 9/1993 | Kosjizuka et al. | 503/227 |
| 5,250,133 | 10/1993 | Kawamura et al. | 156/240 |
| 5,280,005 | 1/1994 | Nakajima et al. | 503/227 |
| 5,330,961 | 7/1994 | Takeyama et al. | 503/227 |

OTHER PUBLICATIONS

Koshizuka et al., Patent Abstracts of Japan, Appl. No.: 04,193929, Filed Jul. 21, 1992, GRP No.:.M1603, ABS vol. No.: vol. 18, No. 245, ABS Pub Date: May 11, 1994.

"Chelate Chemistry (5)", published by Nanko–Do Book Co., Ltd., pp. 10–11, 76–99, 100–102, 177–199, 232–233, 324–335, 342–345, 348–349, 351.

"Polymer Surface Chemistry", Sangyo Tosho Book Co., pp. 19–22 and translation thereof.

JIS K 6772 and a translation of Section 7.4.
JIS K 5400 and a translation of Section 6.15.

*Primary Examiner*—William Krynski
*Attorney, Agent, or Firm*—Frishauf, Holtz, Goodman, Langer & Chick, P.C.

[57] ABSTRACT

Disclosed is an ID card comprising a support and provided thereon, at least two layers of an image-receiving layer and a protective layer hardened by ultraviolet rays, wherein the ID card comprises a layer adhered to the protective layer, the layer's surface adhered to the protective layer, has the critical surface tension of a surface within the range of 34 to 50 dyne/cm.

13 Claims, No Drawings

ID CARD

FIELD OF THE INVENTION

This invention relates to an ID card and, particularly, to an ID card suitable for a mass production, excellent in durability, preventive of peeling a formed UV-setting protective layer off, capable of protecting a transferred image formed on an image-receiving layer extending over a long period of time, and capable of preserving an important personal information securely.

BACKGROUND OF THE INVENTION

Recently, a variety of ID cards have been popularized, namely, a status certificate, a member's certificate with his photograph, an authentication/identification card and a name card with his photograph, including a license such as a driver's license. Among the above-mentioned ID cards, an ID card such as a driver's license is comprised of a support on which a photograph of a driver's face is formed in a silver halide photographic process and a necessary information is recorded in a printing process and, further, a protective layer is provided thereon. The above-mentioned photograph of a driver's face formed in the silver halide photographic process is to be treated through a series of complicated multi-staged processing steps such as the steps of an exposure, a development, a fixation and a bleaching treatment. It has not always been suitable to take this system in an actual field where a lot of ID cards are to be produced without delay.

Under the above-mentioned recent circumstances, there have been proposed an ID card suitable and convenient for a mass production, that is prepared in such a manner that the surface of a support is provided with an image-receiving layer formed of a transferred-image such as an image having a gradation information in a sublimation type thermal-transfer recording system, or an image having a letter information in a thermally melting type thermal-transfer recording system, and a UV-setting protective resin is coated over the whole surface of the transferred-image formed on the image-receiving layer, so that a hard UV-setting protective layer may be formed by exposing it to UV rays.

However, such an image-receiving layer as in the above-mentioned ID cards is added by a delaminating agent such as silicon with the purpose of preventing a thermally melting adhesion of both of the image-receiving layer and an ink-sheet for thermal-transfer recording use to each other when a transfer-image is formed by making use of the ink-sheet for thermal-transfer recording use. Therefore, a critical surface tension of the image-receiving layer is reduced, so that the adhesion strength of an ID card becomes inadequate between the image-receiving layer and a UV-setting protective layer formed on the surface of the image-receiving layer. Accordingly, when making use of an ID card for a long time, there may be some instances where the UV-setting protective layer may be peeled off. When this is the case, any transferred-image formed on an image-receiving layer cannot be protected, therefore, there has raised such a problem that an important personal information may be lost, or that an ID card at issue may lose its practically adequate strength so that a crease or damage may be produced.

This invention is to provide an ID card capable of solving the above-mentioned problems so as to be suitable for a mass production, capable of preventing a UV-setting protective layer from peeling off even if it is used for a long time, excellent in durability, capable of protecting a transferred-image extending over a long period of time, and capable of preserving an important personal information securely.

SUMMARY OF THE INVENTION

For achieving the above-mentioned objects of the invention, the present inventors have devoted themselves to studying and, as the results, when a specific critical surface tension is provided to a layer adhered to a UV-setting protective layer on an image-receiving layer, or the tension is provided to a layer adhered to a UV-setting protective layer on a transparent protective layer in the case that the transparent protective layer is interposed between the image-receiving layer and the UV-setting protective layer, the inventors have discovered the facts that the adhesive property can be improved between a transparent protective layer and a UV-setting protective layer, so that the UV-setting protective layer may effectively be prevented from peeling off. Thereby, the invention was achieved.

The object of this invention is, therefore, to provide an ID card as shown in an item (1).

Item (1): an ID card comprising a support and provided thereon, at least two layers of an image-receiving layer and a protective layer hardened by ultraviolet rays, wherein the ID card comprises a layer adhered to the protective layer, the layer's surface adhered to the protective layer, has the critical surface tension of a surface within the range of 34 to 50 dyne/cm.

Another object of the present invention is to provide an ID card as shown in an item (2).

Item (2): an ID card of item (1) further comprises a transparent protective layer.

Another object of the present invention is to provide an ID card as shown in an item (3), Item (3): the ID card of item (2), wherein said transparent protective layer comprises polyvinyl acetal resin.

Another object of the present invention is to provide an ID card as shown in item (4).

Item (4): the ID card of items (1), wherein said protective layer comprises at least one of hardened compound of prepolymer or hardened compound of monomer, and the hardened compound of prepolymer is prepared with applying ultraviolet rays to said prepolymer having an epoxy group, and the hardened compound of monomer is prepared with applying to ultraviolet rays to said monomer having an epoxy group.

Now, an ID card relating to the invention will be detailed.

An ID card relating to the invention has an image-receiving layer (1), a transparent protective layer (2), a support (3), an intermediate layer (4) formed if required, a UV-setting protective layer (5), and a writing layer (6) formed if required.

(1) An image-receiving layer

In the above-mentioned ID card, a layer on the UV-setting protective layer, that adheres to an image-receiving layer, has a critical surface tension within the range of 34 to 50 dyne/cm at an ordinary temperature and, preferably, 37 to 44 dyne/cm. When the above-mentioned critical surface tension is less than 34 dyne/cm, the adhesive property to the UV-setting protective layer will be deteriorated so that the UV-setting protective layer may sometimes be peeled off. On the other hand, when exceeding 50 dyne/cm, a coating solution for forming the UV-setting protective layer is overflown to the back-side of the trailing end of a subject ID card, so that the protective layer may be substantially unset, or some bubbles or wrinkles may sometimes be produced around the trailing end of the ID card. The above-mentioned critical surface tension may be obtained by measuring a contact angle when a liquid having a different surface tension is dropped to the surface of a layer adhered to the UV-setting protective layer. In the invention, it is preferable that an adhering strength of the above-mentioned image-receiving layer to the UV-setting protective layer is relatively stronger than an adhering strength between other layers of a subject ID card.

The above-mentioned image-receiving layer may be formed basically by making use of a binder for forming an image-receiving layer, in any one of various processes. The composition of the above-mentioned binder for forming an image-receiving layer may be suitably selected so as to meet a purpose. The above-mentioned image-receiving layer is preferable to contain a surface lubricant and it is also allowed to contain a metal ion of which will be detailed later and, further, a variety of additives. The above-mentioned image-receiving layer may be formed of a single layer or plural layers.

When the later-mentioned intermediate layer is provided to the surface of the aforementioned support, a thickness of an image-receiving layer formed on the support surface is ordinarily within the range of 1 to 20 μm and, preferably, 3 to 10 μm.

Binder for forming an image-receiving layer

There is no special limitation to a binder for forming an image-receiving layer, but various resins which themselves have been well-known may be used for. They include, for example, polyvinyl chloride resin, a copolymer resin of vinyl chloride and other monomer (such as isobutyl vinyl ether and vinyl propionate), polyester resin, poly(meth) acrylate, polyvinyl pyrrolidone, a polyvinyl acetal type resin, polyvinyl alcohol, polycarbonate, cellulose triacetate, polystyrene, a copolymer of styrene and other monomer (such as an acrylate, acrylonitrile and ethylene chloride), vinyl toluene acrylate resin, polyurethane resin, polyamide resin, urea resin, epoxy resin, phenoxy resin, polycaprolactone resin, polyacrylonitrile resin and the modified matters thereof.

Among the above-given binders, a polyvinyl chloride resin, a copolymer of vinyl chloride and other monomer, polyester resin, polyvinyl acetal type resin, a copolymer of styrene and other monomer and epoxy resin may preferably be used. These resins may be used independently or in combination. The above-given various resins may be used not only after newly synthesized in various processes, but also by obtaining them as the available on the market.

A variety of the above-mentioned resins are cross-linked or hardened by radiation, heat, moisture, catalyst or the like with utilizing their reaction active site (provided that a reaction active site is given to a resin, if the resin has no reaction active site). When this is the case, it is allowed to use a radiation active monomer such as epoxy and acryl and a cross-linking agent such as isocyanate.

<Surface lubricant>

For making easier to peel off an ink sheet and an image-receiving layer from the above-mentioned image-receiving layer after completing the later-mentioned formation of an image, it is preferable to add a surface lubricant to the image-receiving layer.

The above-mentioned surface lubricants include, for example, a silicone oil (including those so-called a silicone resin), a solid wax such as polyethylene wax, amide wax and Teflon powder, a surfactant of the fluorine type and the phosphoric acid ester type, a filler such as a fine metal powder, silica gel, a metal oxide, carbon black and fine resin powder. They may be used independently or in combination.

The above-mentioned silicone oils may be classified by the type of adding it simply to an image-receiving layer (or the simple addition type) and the type of hardening it or reacting it (or the hardening reaction type).

In the case of the above-mentioned simple addition type, it is preferable to use a modified silicone oil (including, for example, a polyester-modified silicone resin, a urethane-modified silicone oil and an acryl-modified silicone oil) so as to improve the dissolving compatibility with a binder used. The above-mentioned simple addition type silicone oil may be added commonly in an amount within the range of 0.1 to 30% by weight and, preferably, 0.5 to 20% by weight to a binder for an image-receiving layer use, provided, however, the amount thereof to be added may not be determined indiscriminately, because the amount added may be varied according to the kinds of the silicone oils.

The above-mentioned hardening reaction type silicone oils include, for example, those of the reaction-hardenable type (that is, those prepared by making a hardening reaction of an amino-modified silicone oil with an epoxy-modified silicone oil), those of the photo-hardenable type and those of the catalyst-hardenable type. It is preferable to add these hardenable type silicone oil in an amount within the range of 0.5 to 30% by weight to a binder for an image-receiving layer use.

It is preferable to add a surface lubricant other than the above-mentioned silicone oils in an amount commonly within the range of 1 to 40% by weight to an image-receiving layer used.

A metal ion-containing compound

When the above-mentioned image-receiving layer contains a metal ion-containing compound and a thermally diffusible dye that is thermally transferred to the image-receiving layer is chelatable, an excellently fixable image can be formed, because the chelating dye is formed of the thermally diffusible dye and the metal ion-containing compound.

A metal ion capable of constituting the above-mentioned metal ion-containing compound include, for example, a divalent or polyvalent metal belonging to Group I to Group VIII of the periodic table. Among them, Al, Co, Cr, Cu, Fe, Mg, Mn, Mo, Ni, Sn, Ti and Zn are preferred and, inter alia, Ni, Cu, Co, Cr and Zn are particularly preferred.

As for the compounds each containing a metal ion, an inorganic or organic salt of the metals and the complexes of the metals are preferred. The concrete examples thereof include, preferably, a complex containing $Ni^{2+}$, $Cu^{2+}$, $Co^{2+}$, $Cr^{2+}$ or $Zn^{2+}$, which may be represented by the following chemical formula.

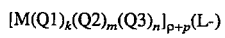

$[M(Q1)_k(Q2)_m(Q3)_n]_{p+p}(L-)$ wherein M represents a metal ion, and Q1, Q2 and Q3 represent each a coordination compound capable of coordination-bonding to a metal ion represented by M. The coordination compounds may be selected out of the coordination compounds given in, for example, "Chelate Chemistry (5)" published by Nanko-Do Book Co., Ltd. The concrete examples thereof include a coordination compound having at least one amino group capable of coordination-bonding to a metal, such as ethylenediamine and the derivatives thereof, glycine and the derivatives thereof and picoline amide and the derivatives thereof.

In the above-given chemical formula, L represents a counter anion capable of forming a complex. The concrete examples thereof include an inorganic compound such as Cr, $S_4$ and $ClO_4$ and an organic compound such as a benzene sulfonic acid derivative and an alkyl sulfonic acid derivative. Inter alia, tetraphenyl boron anion and the derivatives thereof, and alkylbenzene sulfonic acid anion and the derivatives thereof are preferred.

In the chemical formula, k is an integer of 1, 2 or 3, m is an integer of 1, 2 or 0 and n is an integer of 1 or 0. These integers are determined by whether a complex represented by the formula is formed by at tetradenate ligand or quadridentate ligand, or it is determined by the numbers of ligands; and p is an integer of 1, 2 or 3.

This kind of the metal ion-containing compounds include those exemplified in U. S. Pat. No. 4,987,049. The above-mentioned metal ion-containing compound may be added in an amount within the range of, preferably 0.5 to 20 g/m$^2$ and, particularly 1 to 10 g/m$^2$ to an image-receiving layer used.

Additives

The aforementioned image-receiving layer is allowed to contain the following additives, namely, an antioxidant, a UV absorbent, a light stabilizer, a filler (comprising inorganic fine particles or organic resin particles) and a pigment, and, further, a plasticizer and a thermally fusible substance as a sensitizer.

The above-mentioned antioxidants include, for example, an antioxidant given in JP OPI Publication Nos. 59-182785/1984, 60-130735/1985 and 1-127387/1989, and a compound having been well-known as a compound capable of improving an image durability of a photographic material or other image-recording materials.

The above-mentioned UV absorbents and light stabilizers include, for example, a compound given in JP OPI Publication Nos. 59-158287/1984, 63-74686/1988, 63-145089/1988, 59-19692/1984, 62-229594/1987, 63-122596/1988, 61-283595/1986 and 1-204788/1989, and a compound having been well-known as a compound capable of improving an image durability of a photographic material or other image-recording materials.

The above-mentioned fillers include, for example, inorganic fine particles and organic resin particles. They may also be served as the aforementioned surface lubricants.

The aforementioned inorganic fine particles include, for example, silica gel, calcium carbonate, titanium oxide, acid clay, activated clay and alumina. The aforementioned Organic fine particles include, for example, resin particles such as fluororesin particles, guanamine resin particles, acrylic resin particles and silicone resin particles. These inorganic or organic resin particles may be added preferably in an amount within the range of 0.1 to 70% by weight, provided, however, the amount added may be varied by the specific gravities thereof.

The aforementioned pigments include, typically, titanium white, calcium carbonate, zinc oxide, barium sulfate, silica, talc, clay, kaolin, activated clay and acid clay.

The aforementioned plasticizers include, for example, a phthalic acid ester, a trimellitic acid ester, an adipic acid ester and, besides, a saturated or unsaturated carboxylic acid ester, a citric acid ester, epoxidated soybean oil, epoxidated linseed oil, an epoxystearic acid epoxy, an orthophosphoric acid ester, a phosphorous acid ester and a glycol ester.

The aforementioned thermally fusible substances include, for example, an alcohol such as terpineol, menthol, 1,4-cyclohexane diol and phenol, an amide such as acetamide and benzamide, an ester such as coumarin and benzyl cinnamate, an ether such as diphenyl ether and crown ether, a ketone such as camphor, and p-methyl acetophenone, an aldehyde such as vanillin and dimethoxy benzaldehyde, a hydrocarbon such as norbornene and stilbene, a higher aliphatic acid such as margaric acid, a higher alcohol such as eicosanol, a higher aliphatic acid ester such as cetyl palmitate, a higher aliphatic acid amide such as stearic acid amide, a monomolecular compound typified by a higher amine such as behenyl amine, a wax such as carnauba wax, beeswax, paraffin wax, ester wax, montan wax and amido wax, a rosin derivative such as ester gum, rosin maleic acid resin and rosin phenol resin, a phenol resin, a ketone resin, an epoxy resin, a diallyl phthalate resin, a terpene resin, an aliphatic type hydrocarbon resin, a cyclopentadiene resin, a polyolefin type resin, and a macromolecular compound typified by a polyoleffin oxide such as polyethylene glycol and polypropylene glycol. In the invention, the aforementioned thermally fusible substances include, preferably, a compound having a melting point or softening point within the range of 10° to 150° C.

In the invention, it is preferable that the amount of the whole additive added is to be usually selected from an amount within the range of 0.1 to 30% by weight to a resin for an image-receiving layer use.

Preparation of an image-receiving layer

The above-mentioned image-receiving layer can be prepared in the following coating process. After a coating solution for an image-receiving layer is prepared by dispersing or dissolving a component for forming an image-receiving layer in a solvent, the resulting coating solution is coated on the surface of the aforementioned support and then dried. It is also allowed to prepare an image-receiving layer in the following lamination process. A mixture of the components for forming the above-mentioned image-receiving layer is fused and extruded and the resulting extrusion is laminated on the surface of the aforementioned support.

A solvent applicable to the above-mentioned coating process include, for example, those having so far been well-known, such as water, alcohol, methylethyl ketone, toluene, dioxane and cyclohexanone.

When making use of the above-mentioned lamination process, it is also allowed to make combination use of a co-extrusion process.

The above-mentioned image-receiving layer may be formed over the whole surface on one side of a support, or may also be formed on a part of the surface thereof. In the invention, it is preferable to form an image-receiving layer on a part of a support.

Formation of a transfer image

On the above-mentioned image-receiving layer, there forms an image containing a gradation-information such as a portrait image having contrast gradations and an image containing a character-information expressing characters, drawings and marks each showing an information on an individual possessing an ID card of his own or an information inherent in an issuer who issues the ID card, by making use of an ink sheet for thermal-transfer recording use.

An ink sheet for thermal-transfer recording use is basically formed by laminating an ink layer on a support. Such an ink sheet as mentioned above include, for example, those having a fusible ink layer applicable to a thermally fusible recording system (or an ink sheet for thermally fusible type transfer-recording use), or those having a thermally diffusible dye-containing ink layer, that is applicable to a thermally diffusible image-transfer system, (or an ink sheet for thermally diffusible transfer-recording use). Among them, usually, a contrast-gradation information-containing image and so forth may be formed by making use of an ink sheet for thermally diffusible image-transfer recording use. The character information-containing image may be formed by making use of a thermally fusible type image-transfer recording use.

Now, an ink sheet for thermally diffusible image-transfer recording use and an ink sheet for thermally fusible type image-transfer recording use will be detailed.

Ink sheet for thermally diffusible image-transfer recording use

<1> Support

There is no special limitation to the above-mentioned supports, provided that the dimensional stability thereof may be excellent and a heat resistive material is used therein when recording through a thermal head. They include, for example, those made of a thin paper such as a condenser paper and a glassine paper, and a heat-resistive plastic film such as those made of polyethylene terephthalate, polyethylene naphthalate, polyamide, polyimide, polycarbonate, polysulfone, polyvinyl alcohol, cellophane and polystyrene.

The above-mentioned supports are preferable to have a thickness within the range of 2 to 10 μm. There is no special limitation to the configurations of the supports. For example, the configurations thereof include a wide sheet or film, a narrow tape or card, and so forth.

<2> Ink layer

When an image is transferred to an image-receiving sheet in a thermally diffusible image-transfer system, the above-mentioned ink layer is to contain a thermally diffusible dye and a binder each as the inevitable components.

<2.1> Thermally diffusible dye

The above-mentioned thermally diffusible dyes include, for example, a cyan dye, a magenta dye and a yellow dye.

The cyan dyes include, for example, a naphthoquinone type dye, an anthraquinone type dye and an azomethine type dye each of which are described in, for example, JP OPI Publication Nos. 59-78896/1984, 59-227948/1984, 60-24966/1985, 60-53563/1985, 60-130735/1985, 60-131292/1985, 60-239289/1985, 61-19396/1986, 61-22993/1986, 61-31292/1986, 61-31467/1986, 61-35994/1986, 61-49893/1986, 61-148269/1986, 62-191191/1987, 63-91288/1988, 63-91287/1988 and 63-290793/1988.

The magenta dyes include, for example, an anthraquinone dye, an azo dye and an azomethine type dye each of which are described in, for example, JP OPI Publication Nos. 59-78896/1984, 60-30392/1985, 60-30394/1985, 60-253595/1985, 61-262190/1986, 63-5992/1988, 63-205288/1988, 64-159/1989 and 64-63194/1989.

The yellow dyes include, for example, a methine type dye, an azo type dye, a quinophthalone type dye and an anthraisothiazole type dye each of which are described in, for example, JP OPI Publication Nos. 59-78896/1984, 60-27593/1985, 60-31560/1985, 60-53565/1985, 61-12394/1986 and 63-122594/1988.

The particularly preferable thermally diffusible dyes include, for example, an azomethine dye prepared by making a coupling reaction of a compound having a chain-opened or chain-closed active methylene group with the oxidant of a p-phenylene diamine derivative or a p-aminophenol derivative, and an indoaniline dye prepared by making a coupling reaction of the compound having a chain-opened or chain-closed active methylene group with the oxidant of a phenol or naphthol derivative, a p-phenylene diamine derivative or a p-aminophenol derivative.

As for a thermally diffusible dyes each contained in the above-mentioned thermally diffusible dye-containing ink layer, any one of a yellow dye, a magenta dye and a cyan dye may be used, provided that an image to be formed is monochromatic.

When a metal ion-containing compound is contained in an image-receiving layer of an ID card, it is preferable to use a dye compound as the above-mentioned thermally diffusible dyes so that a chelate can be formed by making combination use of the above-mentioned metal ion-containing compound.

There is no special limitation to a dye compound capable of forming a chelate by making combination use of the metal ion-containing compound. Various kinds of compounds having been well-known by themselves may be suitably selected so as to be used. To be more concrete, they include, for example, a cyan image forming dye (hereinafter abbreviated to a cyan dye), a magenta image forming dye (hereinafter abbreviated to a cyan dye) and a yellow image forming dye (hereinafter abbreviated to a cyan dye) each of which are described in, for example, JP OPI Publication Nos. 59-78893/1984 and 59-109349/1984, and JP Application Nos. 2-213303/1990, 2-214714/1990 and 2-203742/1990.

Among these dyes given above, it is preferable to use a dye compound at least capable of forming two-coordinate chelate by making combination use of the metal ion-containing compound. The dyes preferably applicable for this purpose include, for example, a dye represented by the following chemical formula.

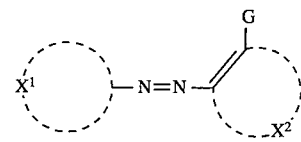

Exemplified compounds of thermally diffusible cyan dyes are as follows.

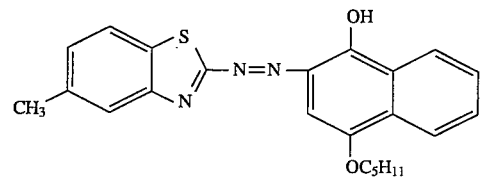

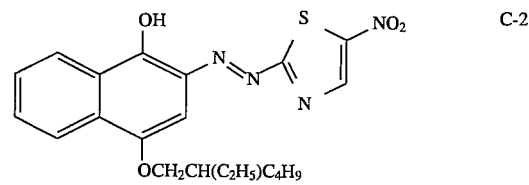

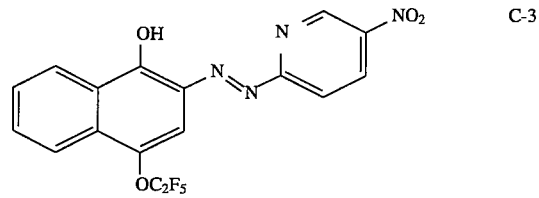

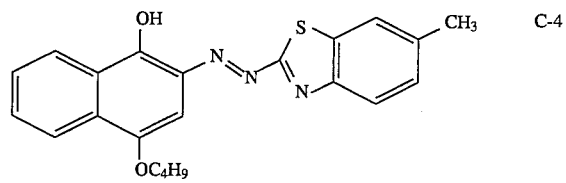

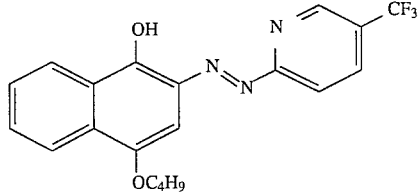
C-5

Exemplified compounds of thermally diffusible magenta dyes are as follows.

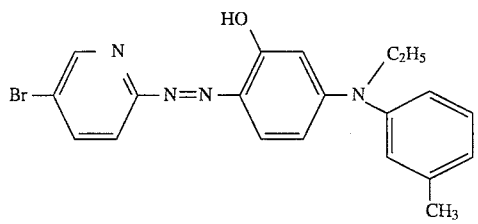
M-1

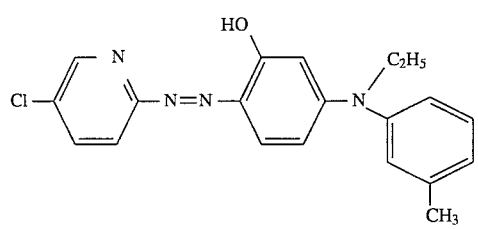
M-2

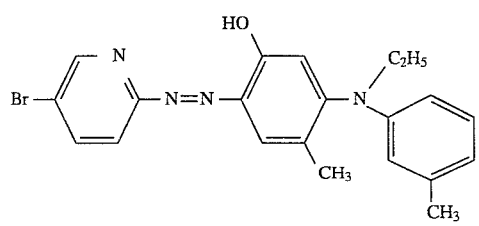
M-3

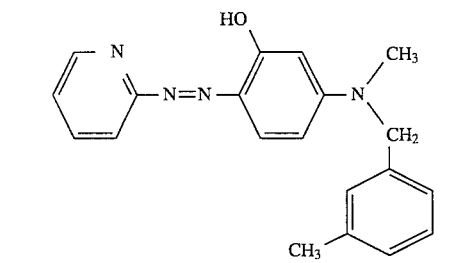
M-4

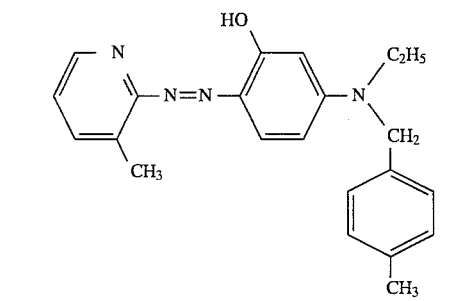
M-5

Exemplified compounds of thermally diffusible yellow dyes are as follows.

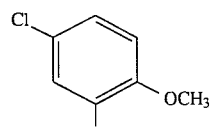
Y-1

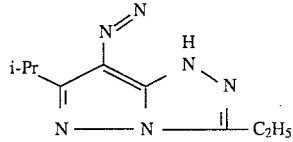
Y-2

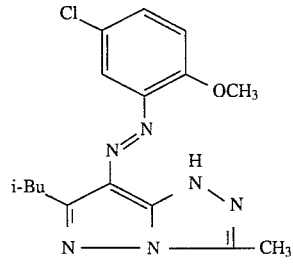
Y-3

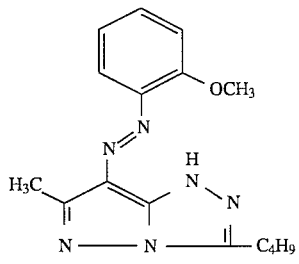
Y-4

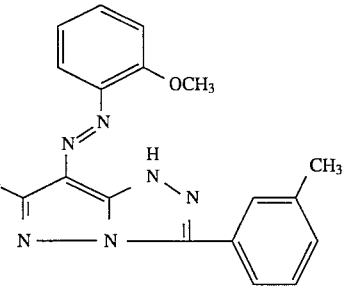
Y-5 wherein $X^1$ represents an aromatic carbon ring of which at least one ring is constituted of 5 to 7 atoms, or a group consisting of atoms necessary to complete a heterocyclic ring, and in which an atom, that is positioned in at least one position adjacent to the position of carbon atom capable of coupling to an azo bond, is a nitrogen atom or a carbon atom substituted with a chelating group; $X^2$ represents an aromatic heterocyclic ring of which at least one ring is constituted of 5 to 7 atoms, or an aromatic carbon ring; and G represents a chelating group.

Regardless of making use of any one of the above-mentioned dye compounds, two or more kinds out of the three kinds of dyes or other thermally diffusible dyes may also be contained in the dye compound, depending on the color tones of an image subjected to image formation.

The above-mentioned thermally diffusible dyes are ordinarily used in an amount within the range of 0.1 to 20 g per sq.meter of a support of the above-mentioned ink sheet and, preferably, 0.2 to 5 g.

<2.2> Binder

The aforementioned binders include, for example, a cellulose type resin such as a cellulose adduct compound, a cellulose ester and cellulose ether, a polyvinyl acetal resin such as polyvinyl alcohol, polyvinyl formal, polyvinyl acetacetal and polyvinyl butyral, a vinyl type resin such as polyvinyl pyrrolidone, polyvinyl acetate, polyacrylamide, a styrene type resin, a poly(meth)acrylic acid type ester, poly (meth) acrylic acid and a (meth) acrylic acid copolymer, a rubber type resin, an ionomer resin, an olefin type resin and a polyester resin.

Among the resins given above, it is preferable to use polyvinyl butyral, polyvinyl acetacetal or a cellulose type resin each excellent in preservability. Each kind of the above-given binders may be used independently or in combination. A weight ratio of such a binder as mentioned above to such a thermally diffusible dye as mentioned above is to be within the range of, preferably 1:10 to 10:1 and, particularly 2:8 to 7:3.

<2.3> Other optional components

A variety of additives may suitably be added to the aforementioned ink layer.

The aforementioned additives include, for example, a surface lubrication compound such as silicone resin, silicone oil (including those of the reaction-setting type), a silicone modified resin, fluororesin, a surfactant and a wax, a filler such as a fine metal powder, silica gel, a metal oxide, carbon black and a fine resin powder, and a hardening agent capable of reacting with a binder component (such as a radiation-activated compound, e.g., an isocyanate, an acryl and an epoxy). Besides the above, the following compounds may also be added as an additive; namely, a thermally fusible substance for accelerating an image-transfer, such as wax and a higher aliphatic acid ester each of which is described in, for example, JP OPI Publication No. 59-106997/1984.

<3> Other layers

The constitution of the aforementioned ink sheet for thermally diffusible image-transfer use shall not be limited to a double-layered constitution comprising a support and an ink layer, but it may also be a constitution in which other layer is formed therein.

For example, for the purpose of preventing a fusion of an ink layer to an image-receiving layer in an ID card, an overcoat layer may also be provided to the surface of the above-mentioned ink layer.

To a support, a sublayer may further be provided with the purposes of improving the adhesive property to a binder used and preventing a dye from transferring or from dyeing to the side of the support. To the rear side of the support (or, to the opposite side of an ink layer), an antisticking layer may further be provided with the purposes of preventing a head from sticking with or fusing into the support and also preventing an ink sheet for thermally diffusible image-transfer recording use from producing wrinkles.

The above-mentioned overcoat layer, a sublayer and an antisticking layer are usually to have a thickness within the range of 0.1 to 1 µm.

{Preparation of ink sheet for thermally diffusible image-transfer recording use}

The above-mentioned ink sheet for thermally diffusible image-transfer recording use can be prepared in the following manner. A coating solution for forming an ink layer is prepared by dispersing or dissolving each of the components for forming an ink layer in a solvent. The resulting coating solution is coated on the surface of a support and then dried up.

The aforementioned binder is dissolved in a single kind of or not less than two kinds of solvents, or is dispersed latexwise, so that it may be used.

The above-mentioned solvents include, for example, water, ethanol, tetrahydrofuran, methylethyl ketone, toluene, xylene, chloroform, dioxane, acetone, cyclohexane and normal butyl acetate.

The processes for carrying out the above-mentioned coating operation include, for example, a surface-sequential type portion-out coating method carried out by making use of a gravure-roll, an extrusion-coating method, a wire bar-coating method and a roll-coating method each having so far been well-known.

The above-mentioned ink layer may be formed on the whole surface or a part of the surface of a support so as to serve as a layer containing a thermally diffusible monochromatic dye, and a yellow ink layer containing a binder and a yellow dye, a magenta ink layer containing a binder and a magenta dye and a cyan ink layer containing a binder and a cyan dye may also be formed, along the plane direction with a specific repetition, on the whole surface or a part of the surface of a support. In addition to the above-mentioned three ink layers arranged along the plane direction, a black ink layer containing a black image-forming substance may further be interposed therein. Even when a black ink layer is of the diffusible image-transfer type or of the fusible image-transfer type, a sharp image can be obtained.

An ink layer formed thereby may have a thickness within the range of, usually 0.2 to 10 µm and, preferably 0.3 to 3 µm.

When an ink sheet for thermally diffusible image-transfer recording use is provided with perforations or with detection marks for detecting the positions of different hue areas, the convenient use can also be enjoyed.

Formation of a contrast gradation information-containing image by making use of the ink sheet for thermally diffusible image-transfer recording use A contrast gradation information-containing image may be formed in the following manner, for example. The ink layer of the above-mentioned ink sheet for thermally diffusible image-transfer recording use and the image-receiving layer of an ID card are laid one on top of the other, and heat energy is then applied imagewise to the interface between the ink layer and the image-receiving layer. Thereby, a thermally diffusible dye contained in the ink layer is vaporized or sublimated in such an amount as to meet the heat energy applied when the image is formed, so that the vaporized or sublimated dye is transferred to the side of the image-receiving layer and is then accepted thereby. Resultingly, a dye image (that is, a contrast gradational (color) image such as a color portrait photographic image) can be formed.

When an image-receiving layer added with the aforementioned metal ion-containing compound is used as an image-receiving layer for an ID card, the above-mentioned dye image may be formed as a chelate image.

As for a heat source capable of giving a heat energy, a thermal head is commonly used. Beside the above, laser beam, infrared flash, a thermal pen and so forth which have so far been well-known, may be used for.

When a thermal head is used for a heat source capable of giving a heat energy, a heat energy to be given may be varied continuously or multistagewise, by modulating a voltage or pulse duration to be applied to the thermal head.

When a laser beam is used for a heat source capable of giving a heat energy, a heat energy to be given may be varied by changing a light quantity of the laser beam or an irradiated area thereof. In this case, for making a laser beam easier to be absorbed, it is advisable to make present a laser beam absorbent (such as carbon black and a near-infrared absorbable substance) inside an ink layer or in the neighborhood thereof, when a semiconductive laser is used). When a laser beam is used for a heat source, it is advisable to bring an ink sheet for thermally diffusible image-transfer recording use and an image-receiving layer into satisfactorily close contact with each other.

When making use of a built-in acoustooptic element dot generator, a heat energy can also be applied so as to meet any halftone dot sizes.

When making use of an infrared flash lamp as a heat source capable of applying a heat energy, it is advisable to apply heat through a layer colored in black, for example, as in the case of making use of a laser beam. Or, it is also allowed to apply heat through a pattern or a halftone pattern each expressing an image densities continuously, and it is further allowed to apply heat through the combination of a colored layer in total black or the like and a negative pattern equivalent to the negative of the above-mentioned pattern.

A heat energy may be applied from the side of an ink sheet for thermally diffusible image-transfer recording use, from the side of the image-receiving layer of an ID card, or from the both sides thereof. However, for making the effective utilization of a heat energy to have a priority, it is preferable to apply a heat energy from the side of an ink sheet for thermally diffusible image-transfer recording use.

Following the above-mentioned thermal transfer recording procedures, a monochromatic image can be recorded on an image-receiving layer of an ID card. However, in the following procedures, a color image can be provided so as to have a color photographic tone consisting of a hybridization of each color. For example, when the thermosensitive sheets in yellow, magenta, cyan and, if required, black are replaced by one after another and a thermal-transfers are carried out respectively so as to meet every color, a color image having a color photographic tone consisting of a hybridization of each color can also be obtained.

Besides the above, the following procedures are also effective. To be more concrete, in place of every color ink sheet for thermally diffusible color image-transfer recording use, an ink sheet for thermally diffusible image-transfer recording use is used to have areas provided in advance by separating the areas into individual colored areas, respectively.

The following procedures are taken. First, a yellow-separated image is thermally transferred to a yellow area. Next, a magenta-separated image is thermally transferred to a magenta area, and so forth so as to thermally transfer the yellow-separated image, magenta-separated image, cyan-separated image and, if required, black-separated image, repeatedly in order. Even in the procedures, a color image having a color photographic tone can be obtained and, to be more favorable, this procedure has such an advantage that any replacement of thermosensitive sheets for thermal-transfer recording use is not necessary, as is different from the aforementioned case.

Further, after an image is formed in the above-mentioned procedures, it is also allowed to carry out a heat treatment in the above-mentioned procedures, with the purpose of improving an image preservability. For example, a heat treatment may be carried out extending over the whole image-formed surface by making use of a thermal head and an area whereto any ink layer of an ink sheet is not provided, or, a heat treatment may also be newly carried out by making use of a heat-roll or the like. When a near-infrared absorbent is contained therein, an image-forming surface may also be exposed to an infrared flash lamp.

In any one of the above-mentioned cases, the purpose is to further diffuse a dye into an image-receiving layer, regardless of heating means. Therefore, it is effective and preferable to apply heat from the direction of the support side of the image-receiving layer.

Following the above-mentioned procedures, a contrast-gradation information-containing image can be formed on an image-receiving layer.

Thermally fusible type thermosensitive image-transfer ink sheet

When preparing an ID card of the invention, a thermally fusible type thermosensitive image-transfer ink sheet of the invention may be used. The thermally fusible type thermosensitive image-transfer ink sheet may be formed by laminating a specific thermofusible ink layer on a support in this order and, if occasion requires, by interposing a delamination layer between the support and the thermofusible ink layer. The thermally fusible type thermosensitive image-transfer ink sheet may also have other layers than the above-mentioned, provided that the characteristics thereof cannot be spoiled. For example, an intermediate layer and so forth may be interposed between the above-mentioned delamination layer and the support for the ink sheet. Other layers may also be laminated on the above-mentioned thermofusible type ink layer, such as that an ink protective layer may also be arranged to the uppermost layer, and so forth. Further, the above-mentioned delamination layer or thermofusible type ink layer may each have a multilayered structure, if required.

<1> Support

A support constituting a thermofusible type thermosensitive image-transfer ink sheet is preferable to have an excellent heat resistance and a high dimensional stability. The raw materials applicable to such a support as mentioned above include, for example, a film and a sheet described in JP OPI Publication No. 63-193886/1988, p. 2, lines 12 to 18 in the lower left column.

The above-mentioned support is to have a thickness of, usually not thicker than 30 μm and, preferably within the range of 2 to 30 μm. When the thickness of a support exceeds 30 μm, the heat conductivity thereof is deteriorated so that there may be some instances where a letter-printing quality may be lowered.

In the above-mentioned thermofusible type thermosensitive image-transfer ink sheet, the constitution of the rear surface of the support thereof may not be limitative, but freely selected. For example, a backing layer may also be arranged thereto for the purpose of keeping or improving a running stability, antistaticity, heat resistance and so forth.

<2> Thermofusible type ink layer

A thermofusible type ink layer contains a coloring material and, for bonding to each other, a thermofusible type compound, a thermoplastic type resin and so forth are contained therein. The thermofusible type ink layer contains further may also contain a variety of additives, if required.

<2.1> Coloring material

The above-mentioned coloring materials applicable as a component of the above-mentioned thermofusible type ink layer include without limitation, for example, those usually applicable to a thermofusible type ink layer of the above-mentioned kind of the thermofusible type thermosensitive image-transfer ink sheets. To be more concrete, they include, for example, a pigment such as an inorganic pigment and an organic pigment and a dyestuff such as an organic dyestuff. These various kinds of coloring materials may be used independently or in combination, if required.

<2.2> Thermoplastic type resin

The above-mentioned thermoplastic type resins applicable as the component of the above-mentioned thermofusible type ink layer include those of the various kinds including, for example, those applicable to the thermofusible type ink layer of this kind of thermofusible type thermosensitive image-transfer ink sheet. They include, for example, the substances exemplified in JP OPI Publication No. 63-193886/1988, in the right upper column on p. 4 to line 18 in the left upper column on p. 5.

And, in fact, the thermoplastic type resins are preferable to have a melting point in the order that it may not be softened by a heat applying temperature when a transparent protective layer is formed by a hot stamp. Taking a heat applying temperature when ordinarily hot stamping and a heat applying temperature when making an image-transfer into consideration, a softening point of a thermoplastic type resin applicable thereto is preferable to be not lower than 80° C. and, more preferable to be not lower than 90° C. It is preferable to select a thermoplastic type resin having such a softening point as mentioned above out of the well-known thermoplastic type resins.

<2.3> Thermofusible type compound

As for the above-mentioned thermofusible type compounds, those usually applicable to the thermofusible type ink layer of this kind of thermofusible type thermosensitive image-transfer ink sheet may freely be used. To be more concrete, they include, for example, a lower molecular weight substance of thermoplastic type resins such as a polystyrene resin, an acrylic resin, a styrene-acrylic resin, a polyester resin and a polyurethane resin; and the exemplified substances given in JP OPI Publication No. 63-193886/1988, line 8 in the left upper column on p. 4 to line 12 in the right upper column on the same page. Besides the above, they further include, for example, rosin; a rosin derivative such as hydrogenated rosin, polymerized rosin, rosin-modified glycerol, rosin-modified maleic resin, rosin-modified polyester resin, rosin-modified phenol resin and the ester gums thereof; phenol resin, terpene resin, ketone resin, cyclopentadiene resin; and an aromatic hydrocarbon resin.

The above-mentioned thermofusible type compounds are to have a molecular weight of, usually not more than 10,000 and, preferably not more than 5,000. The melting point or softening point thereof is within the range of preferably 50° to 150° C. and particularly 90° to 120° C. The above-mentioned thermofusible type compounds may be used independently or in combination.

<2.4> Additive components

If required, any additive components other than the above may suitably be added to the above-mentioned thermofusible type ink layer, provided that the objects of the invention shall not be spoiled. For example, it is also allowed to contain a fluorine type surfactant in the thermofusible type ink layer. When containing a fluorine type surfactant therein, a blocking phenomenon of the above-mentioned thermofusible type ink layer may be prevented. It may also be effective to add a non-compatible type resin so as to improve the sharpness of a transferred letter information-containing image that is, to improve the sharpcut edge in the interfacial region of a letter. It is further allowed to add non-softening type fine powder for protecting a letter information-containing image from lacking details.

<2.5> Thickness of thermofusible type ink layer and the procedures for forming the ink layer The above-mentioned thermofusible type ink layer is to have a thickness within the range of, commonly 0.6 to 5.0 μm and, preferably 1.0 to 4.0 μm.

The thermofusible type ink layer may be coated in a process of dispersing or dissolving a layer-formation component in an organic solvent and then coating the resulting solution (that is so-called an organic solvent process), a process of softening a thermoplastic type resin by applying heat thereto or making the resin in a fused state, and then coating the resulting softened or fused resin (that is so-called a hot-melt coating process) and so forth. It is, however, preferable coat an ink layer by making use of an emulsion or a solution prepared by dispersing or dissolving a layer-formation component in water or an organic solvent.

In a coating solution applicable to coat the above-mentioned thermofusible type ink layer, a total content of layer-formation component is usually determined within the range of 5 to 50% by weight.

The coating process may be carried out by utilizing an ordinary process. The coating processes include, for example, a process of making use of a wire-bar, a squeeze-coating process and a gravure-coating process.

The thermofusible type ink layer is to be comprised of at least one layer. It is, however, allowed to constitute the ink layer by laminating two or more thermofusible type ink layers each different in kinds and contents of coloring materials, in compounding proportion between a thermoplastic type resin and a thermofusible type compound used therein, and in other like factors.

<3> Delamination layer

A delamination layer is provided with the following purposes. In the step of forming an image and when a delamination layer is heated by a heating mechanism such as a thermal head for transferring the image, at least one of the layers laminated on the above-mentioned delamination layer (at least one layer among the layers is a thermofusible type ink layer containing a coloring material) is to be delaminated and to be transferred rapidly enough; the delamination layer is to be fused by applying heat when a transparent protective layer is formed by hot-stamp; the resulting fusion is to cover the transferred image formed on an image-receiving layer and containing non-softening fine particles; and the transferred image it to be protected thereby. Therefore, the delamination layer is to contain a thermofusible type compound so as to satisfactorily achieving the above-mentioned objects, so that the delamination layer can be constituted to be a layer dominant in the attributive characteristics of the thermofusible type compound and, particularly, to be a layer excellent in delamination property.

The above-mentioned delamination layer may be constituted of the thermofusible type compound by itself given in paragraph <2.3>. However, it is generally preferable that the layer is constituted of the thermofusible type compound and/or a binder resin such as a thermoplastic type resin.

The thermofusible type compounds applicable to be the principal component of the delamination layer may suitably be selected out of various kinds of those having been well-known. The concrete examples thereof include, for example, the exemplified substances given in JP OPI Publication No. 63-193886/1988, line 8 in the upper left column on p. 4 to line 12 in the upper right column on the same page. Among them, carnauba wax, microcrystalline wax and paraffin wax are preferred.

The thermofusible type compounds applicable to the invention is usually to have a melting point of not lower than 80° C. and, preferably, within the range of 90° to 120° C. When the above-mentioned melting point is lower than 80° C., there may be some instances where a letter information-containing image may sometimes lack in detail. These thermofusible type compounds may be used independently or in combination.

The above-mentioned thermoplastic type resins include, for example, an ethylene type copolymer such as an ethylene-vinyl acetate type resin, a polyamide type resin, a polyester type resin, a polyurethane type resin, a polyoleffin type resin, an acryl type resin and a cellulose type resin. Besides the above, they also include, for example, an elastomer such as natural rubber, styrene-butadiene rubber, iso prene rubber and chloroprene rubber, and a rosin derivative such as an ester rubber, a rosin-maleic resin, a rosin-phenol resin and a hydrogenated rosin. And, a phenol resin, terpene resin, cyclopentadiene resin and an aromatic type resin may also be so applicable as to meet the occasions. Among them, an ethylene type copolymer such as an ethylene-vinyl acetate copolymer or an ethylene-vinyl acetate type copolymer and a cellulose type resin are preferred.

In the invention, a thermoplastic type resin, that is applicable to be the component of the above-mentioned delamination layer, include suitably those having a melting point or a softening point within the range of, usually 50° to 150° C. and, particularly 60° to 120° C., or those made to have a melting point or a softening point within the above-given range by mixing not less than two kinds thereof.

The above-mentioned delamination layer is allowed to contain a suitable colorant if occasion required. When containing the colorant in the delamination layer, the content of the colorant is usually not more than 30% by weight to the whole component of the delamination layer and, preferably not more than 20% by weight. The colorants shall not be specially limitative, but the same colorant as described in the column titled "(C.1.2) Thermofusible type ink layer" can be used for.

If required, the above-mentioned delamination layer is further allowed to contain other components besides the above, provided that the objects of the invention shall not be spoiled. the other components include, for example, a higher aliphatic acid, a higher alcohol, a higher aliphatic acid ester, an amide and a higher amine. They may be used independently or in combination.

The delamination layer is to have a thickness within the range of, usually 0.2 to 4 μm and, preferably 0.2 to 2.5 μm.

{Preparation of thermofusible type thermosensitive image-transfer ink sheet}

Basically, a thermofusible type thermosensitive image-transfer ink sheet may be formed in the following manner. A coating solution for forming a thermofusible type ink layer prepared by dispersing or dissolving each component capable of forming a thermofusible type ink layer therein, such coating solution is coated on the surface of a support for ink sheet use, and then dried up.

Formation of letter information-containing image by using a thermofusible type thermosensitive image-transfer ink sheet A thermofusible type image-transfer process in which the above-mentioned thermofusible type thermosensitive image-transfer ink sheet is used is not different from an ordinary thermosensitive image-transfer recording process. However, the case where a thermal head that is the most typical heat source is used will now be detailed as an example.

The thermofusible type ink layer of a thermofusible type thermosensitive image-transfer ink sheet and the image-receiving layer of a base member are brought into close contact with each other. Further, a heat pulse is applied, if required, to the thermofusible type ink layer from the thermal head. Then, the thermofusible type ink layer corresponding to a letter or pattern desired to be image-transferred is locally heated up. The temperature of the heated portion of the thermofusible type ink layer is raised and the heated portion is rapidly softened, so that the image can be transferred to the image-receiving layer of the base member.

A non-contrast information-containing image without requiring the contrast gradation such as the above-mentioned letter, a drawing, a mark or a ruled line may be formed in advance of the formation of the aforementioned contrast information-containing image, and the non-contrast information-containing image may also be formed after completing the formation of the contrast information-containing image.

In such a manner as described above, a letter information-containing image can be formed on the surface of an image-receiving layer so as to contain non-softened fine particles, to be few in volumetric variation against pressure and without lacking in detail even it is pressed. In other words, when a transparent protective layer is formed on the surface of the image-receiving layer by giving a hot stamp, a letter printing can be performed clear-cut and beautifully without crushing any dye of a transferred image. The thermofusible type thermosensitive image-transfer ink sheet can also answer to a letter-printing operated by a thermal head having a high resolving power of not lower than 300 dpI.

(2) Transparent protective layer

When forming a transparent protective layer on the above-mentioned image-receiving layer, it is preferable that the critical surface tension of a UV-setting protective layer of the transparent protective layer and the layer adjacent thereto are each within the range of 34 to 50 dyne/cm and, particularly 36 to 42 dyne/cm at an ordinary temperature. When the critical surface tension is lower than 34 dyne/cm, the adhesion property to the UV-setting protective layer will be deteriorated so that there may be some instances where the UV-setting protective layer may sometimes be peed off. On the other hand, when exceeding 50 dyne/cm, there may be some instances where a coating solution for forming the UV-setting protective layer may be overflown to the backside of the trailing end of an ID card so that an unset portion may be substantially produced or bubbles or wrinkles may be produced in the trailing end. The above-mentioned critical surface tension can be obtained by measuring a contact angle obtained when dropping a liquid having a different surface tension to the surface of a layer adhered to the UV-setting protective layer. In the invention, it is preferable that the adhering strength of the image-receiving layer or the UV-setting protective layer to the transparent protective layer is relatively stronger than the adhering strength between other layers of an ID card.

The above-mentioned adhering strength can be increased, for example, by the achievements of making use of an analogous polymer liable to be thermally fusible; a compound having a polar group such as a carboxyl group, hydroxyl group and an amino group, so as to form an ion bond; and the adjustments of the conditions of pressure, temperature and time each for forming a layer.

The transparent protective layers capable of satisfying such a requirement as given above include, for example a layer containing a transparent protective layer forming substance such as polyvinyl acetacetal, polyvinyl butyral, epoxy resin, acrylic resin, polystyrene resin, styrene-acrylic resin and a cellulose type resin such as ethyl cellulose resin. These substances may be used independently or in combination. Among them, the preferable include, for example, a layer containing polyvinyl acetacetal.

In a transparent protective layer, the content of the above-mentioned transparent protective layer-forming substance is within the range of 10 to 90% by weight, preferably 30 to 70% by weight and, particularly 40 to 60% by weight. When the transparent protective layer-forming substance exceeds 90% by weight, the critical surface tension of a UV-setting protective layer of the transparent protective layer and the layer adjacent thereto are increased at an ordinary temperature, so that there may be some instances where the critical surface tension may be out of the range of 34 to 50 dyne/cm that is specified in the invention. On the other hand, when the critical surface tension thereof is less than 70% by weight, the critical surface tension is reduced, so that there may be some instances where the value thereof may be out of the range specified in the invention.

As for the transparent protective layer-forming substances, those newly synthesized or any one of those available on the market may also be used.

Other than the transparent protective layer-forming substances, there is no special limitation to the components to be contained in the above-mentioned transparent protective layer, but various components may be contained therein, provided that the invention shall not be spoiled.

It is preferable that the transparent protective layer is to have such a characteristic that a UV rays interference can be reduced as small as possible in a sublimable dye, when irradiating UV rays, and that a coating agent cannot come into contact with a sublimable dye, when applying the coating agent.

The areas where the transparent protective layer is to be formed may be only a portion of an image-receiving layer where an image information is to be formed, or may also be the whole surface of the image-receiving layer. The above-mentioned transparent protective layer may be formed on an image-recording member in a hot-stamp system or a thermal-transfer system, for example.

In the above-mentioned transparent protective layer, a UV absorbent may also be contained. The UV absorbent is so effective as to protect an image-information from UV rays when irradiating and setting a coating agent containing a UV-setting type prepolymer, or from daylight when preserving for a long time. There may be some instances where the above-mentioned UV absorbent may hardly be contained in a UV-setting type resin layer, therefore, it becomes effective to add the UV absorbent in a transparent protective layer (that can interfere in setting the UV-setting type resin). Such a UV absorbent as mentioned above include, for example, the compounds exemplified in the descriptions of the image-receiving layer. The UV absorbent may be added in an amount of, ordinarily, not less than 0.6 g/m$^2$ and, preferably, not less than 1 g/m$^2$.

The above-mentioned transparent protective layers may be formed independently or in combination. In the invention, it is preferable to form of a plurality of layers. To be more concrete, it is preferable that a layer adjacent to a UV-setting type protective layer of a transparent protective layer is to contain the aforementioned transparent protective layer-forming substance. When this is the case, the adhering strength to a UV-setting protective layer may be improved.

Taking a uniform coatability of a UV-setting protective layer into consideration, the above-mentioned transparent protective layer is to have a thickness within the range of, ordinarily, 0.5 to 20.0 µm and, preferably, 1.0 to 10.0 µm.

(3) Support

The above-mentioned supports include, for example, various paper supports such as those made of paper or synthetic paper (such as those made of polypropylene, polystyrene or a compounded material pasted with paper), a variety of plastic films or sheets such as a white vinyl chloride type resin sheet, a white polyethylene terephthalate-base film, a transparent polyethylene terephthalate-base film, polyethylene napthalate, an ABS-base film, an AS-base film, a polypropylene-base film and a polystyrene-base film, and a film or sheet formed of various kinds of ceramics.

To the supports, it is preferable to add a white pigment such as titanium white, magnesium carbonate, zinc oxide, barium sulfate, silica, talc, clay and calcium carbonate.

Among them, a sheet or film comprising a vinyl chloride type resin composite containing the above-mentioned white pigment is generally used as an ID card, when the ID card is used as an driver's licence or the like.

Usually, the support is to have a thickness within the range of 100 to 1,000 µm, preferably 100 to 800 µm and, particularly 200 to 800 µm.

If required, the support may also be provided with an embossment, a sign, an IC memory, an optical memory, a barcord, a magnetic recording layer and other prints.

(4) Intermediate layer

In the invention, an intermediate layer may be interposed between the image-receiving layer and the support, if required. There is no special limitation to such an intermediate layer as mentioned above, but the intermediate layer may be formed by suitably selecting it from various materials and layer-forming processes; provided that the ID card configuration can be maintained and the mechanical strength thereof cannot be spoiled.

When providing the above-mentioned intermediate layer, it is preferable to form the intermediate layer so that the adhering strength between the intermediate layer and the support, or the adhering strength between the intermediate layer and the image-receiving layer may be made relatively weaker than any adhering strength between other layers than the above. The above-mentioned case is preferable from the viewpoint that, even if trying to selectively peel off an interface bearing a transferred image formed on the image-receiving layer with intent to deface an ID card, the defacing or the like can effectively be prevented, because at least a part of the interface of the intermediate layer is peed off.

The adhering strength of the intermediate layer is preferred when an adhering strength between the intermediate layer and the support and an adhering strength between the intermediate layer and the image-receiving layer are each relatively weaker than the adhering strength between other layers. In this case, the adhering strength between the intermediate layer and the support and the adhering strength between the intermediate layer and the support may be equivalent to each other or may also be different from each other. It is, however, preferable that the adhering strength between the intermediate layer and the image-receiving layer is relatively weaker than the adhering strength between the intermediate layer and the support.

The reduction of an adhering strength to the interface of the above-mentioned intermediate layer can be achieved, for example, in such a manner that any analogous polymer liable to be thermofusible is not used, that any compound having such a polar group as is capable of forming an ion bond is not used, and that the conditions of pressure, temperature, time and so forth are controlled when forming a layer.

The above-mentioned intermediate layer may be formed by coating the surface of the support with a liquid prepared, for example, by mixing a resin having a low softening point, a thermofusible type substance such as a tackifier and/or a thermoplastic type substance.

The resins having a low softening point applicable to the intermediate layer include, for example, an ethylene type copolymer such as ethylene-vinyl acetate, ethylene-ethyl acrylate; a polyamide type resin such as Nylon and dimerized acid; a polystyrene type resin such as styrene-butadiene, styrene-isoprene and styrene-ethylene-butylene; polyester type resin; polyolefin type resin;, polyvinyl ether type resin; polymethyl methacrylate type resin; ionomer resin; cellulose type resin, polyurethane type resin; acryl type resin, epoxy type resin; melamine type resin; and vinyl chloride type resin.

The tackifiers include, for example, an unmodified or modified rosin type tackifier such as a rosin tackifier, a hydrogenated rosin tackifier, a rosin-maleic acid type tackifier, a polymerized rosin type tackifier and a rosin-phenol type tackifier, a terpene type tackifier, a petroleum resin type tackifier and the modified tackifier thereof.

The thermofusible substances capable of being added to the intermediate layer are the same as the aforementioned thermofusible substances capable of being added to the image-receiving layer.

The intermediate layer-forming processes include, for example, a coating process in which a solvent is used, a hot-melt coating process, and so forth.

Usually, the intermediate layer thus prepared is to have a thickness within the range of 0.1 to 10 μm and, preferably, 0.3 to 5 μm.

(5) UV-setting protective layer

The above-mentioned UV-setting protective layer can be formed in the following manner. A coating agent for forming a UV-setting protective layer, that contains a resin or a resin composite, are each suitably selected out of a variety of UV-setting resins or UV-setting resin composites and a UV absorbable substance, of which will be detailed later. The coating agent is coated on the surface of an image-receiving layer of which will also be detailed later, and the resulting coated image-receiving layer is irradiated by UV rays, so that the UV-setting protective layer can be formed.

The UV-setting resins or UV-setting resin composites include, for example, an epoxy resin or a resin composite comprising an epoxy type resin as the principal component thereof. Epoxy type resin is hardly capable of producing a curling, because it has a low volumetric shrinkage before or after setting itself, and it is also preferable, because the adhering strength thereof to an image-receiving layer or a transparent protective layer is excellent.

A coating agent for forming the above-mentioned UV-setting protective layer can be prepared of a composite containing UV-setting prepolymer and/or a monomer and a polymerization initiator, as the principal components thereof.

The prepolymer and monomer of the UV-setting type include, for example; those of such a type that the molecules thereof are made higher by a radical polymerization (including mainly the acrylate type); and such a type that the molecules thereof are made higher by a cationic polymerization (including mainly the epoxy type). In the invention, either of the two types may be used, provided, the objects of the invention shall not be spoiled. However, the epoxy type prepolymer or monomer is preferred.

Now, the epoxy type UV-setting prepolymer and the monomer thereof will be detailed.

The epoxy type prepolymers or monomers include, for example, a prepolymer containing two or more epoxy groups in the molecular or a monomer containing two or more epoxy groups in the molecular thereof. Such a prepolymer as mentioned above include, for example, an alicyclic type polyepoxide, a polyglycidyl ester of a polybasic acid, a polyglycidyl ether of a polyhydric alcohol, a polyglycidyl ether of a polyoxyalkylene glycol or a polyglycidyl ether of an aromatic polyol, a hydrogenated compound of a polyglycidyl ether of an aromatic polyol, a urethane polyepoxy compound and an epoxidated polybutadiene. These prepolymers may be used either independently or in combination.

In the above-mentioned UV-setting protective layer-forming coating agent, a prepolymer having two or more epoxy groups in the molecule thereof may be contained preferably in a proportion of not less than 70% by weight.

The aforementioned polymerization initiators include, preferably, a cationic polymerization initiator and, concretely, an aromatic onium salt.

The aromatic onium salts include, for example, a salt of an element belonging to group Va of the periodic table, such as a phosphonium salt (e.g., triphenyl phenacyl phosphonium hexafluorophosphate and so forth), a salt of an element belonging to group VIa of the periodic table such as a sulfonium salt (e.g., triphenyl sulfonium tetrafluoroborate, triphenyl sulfonium hexafluorophosphate, tris (4-thiomethoxyphenyl) hexafluorophosphate, sulfonium and triphenyl sulfonium hexafluoroantimonate and so forth), and a salt of an element belonging to group VIIa of the periodic table, such as an iodonium salt (e.g., diphenyl iodonium chloride and so forth).

The application of such an onium salt as mentioned above as a cationic polymerization initiator for polymerizing an epoxy compound is detailed in U.S. Pat. Nos. 4,058,401, 4,069,055, 4,101,513 and 4,161,478.

The preferable cationic polymerization initiators include, for example, a sulfonium salt of the elements belonging to group VIa of the periodic table. Among them, triaryl sulfonium hexafluoroantimonate is preferred from the viewpoints of UV-setting property and storage stability of a UV-setting composite.

In the aforementioned coating agent for UV-setting protective layer use, it is further allowed to contain a surfactant including, for example, an oil (particularly silicone oil), and a silicone-alkylene oxide copolymer (such as L-5410 available on the market from Union-Carbide Co.), and a fluorocarbon surfactant including, for example, a silicone oil-containing aliphatic epoxide, FO-171 and FO-430 each available on the market from 3M Co. and Megafac F-141 available on the market from Dai-Nippon Ink Co.

In the above-mentioned coating agent for UV-setting protective layer use, it is further allowed to contain a vinyl monomer such as those of styrene, paramethyl styrene, a methacrylic acid ester and an acrylic acid ester, a cellulose type compound, and a monoepoxide such as a thermoplastic polyester, phenyl glycidyl ether, silica-containing monoepoxide and butyl glycidyl ether, provided that the effects of the invention shall not be spoiled.

In the above-mentioned coating agent for UV-setting protective layer use, it is still further allowed to contain an inert component including, for example, a dyestuff, a pigment, a thickener, a plasticizer, a stabilizer, a leveling agent, a coupling agent, a tackifier, a silicone group-containing activator, a wetting improver such as a fluorocarbon group-containing surfactant and other various additives. Besides the above, it is also allowed to contain a small amount of solvent such as acetone, methylethyl ketone and methyl chloride, which are scarcely capable of reacting with the above-mentioned cationic polymerization initiators.

In addition, the above-mentioned UV-setting protective layer may contain the following fine particles, for example. When containing fine particles therein, it is preferable, because a forgery and a defacement can effectively prevented as compared to the case without containing any fine particles, also because the discrimination from other cards can easily be made.

There is no particular limitation to the materials of the above-mentioned fine particles. However, an inorganic fine particles include, for example, power and foil of titanium white, magnesium carbonate, zinc oxide, barium sulfate, silica, talc, clay, brass or aluminium. an organic fine particles are preferable to be those incapable of dissolving with any UV-setting resin monomer.

In the invention, the above-mentioned UV-setting protective layer may also contain a colorant.

The colorants include, for example, a dyestuff, a pigment, a fluorescent dye and an infrared-absorbing dye. When containing a colorant in the UV-setting protective layer, the layer is then tinted with a peculiar color tone. It is, therefore, preferable, because there is no possibility of any forgery and/or defacement and also because an easy discrimination from other cards can be made.

The colorants include, for example, a pigment, a dyestuff and an infrared absorbent each of which have so far been generally known in the field of synthetic resin. Such a colorant as mentioned above may be selectively added in any amount without limitation, provided that an information of recording a transfer-image can be confirmed with the eye without trouble.

On the surface Of the above-mentioned UV-setting protective layer, an unevenness having a certain pattern may further be formed. When forming an unevenness having a certain pattern thereon, such as some kind of mark, such a pattern as a fine pattern or a background pattern, it is preferred, because a discrimination from a forgery and/or defacement can be made.

The surface of the above-mentioned UV-setting protective layer may be made uneven in such a method that a UV-setting protective layer is coated with a certain patterned gravure-meshed plate, or that the UV-setting protective layer is embossed at the point of time when the UV-setting resin of the layer is half set.

In setting UV rays, the UV rays mean the rays of light in a ultraviolet rays region, and the UV rays further include the rays of light including the ultraviolet regional rays of light. Accordingly, a UV-ray irradiation includes, for example, sunbeam irradiation, a low-pressure mercury lamp irradiation, a high-pressure mercury lamp irradiation, a ultrahigh-pressure mercury lamp irradiation, a carbon-arc lamp irradiation, a metal halide lamp irradiation and a Xenon lamp irradiation. Further, a high-energy beam such as an electron-beam may also be used so as to meet an occasion required.

By applying heat to a layer coated with a coating agent for UV-setting protective layer use so as to be set the coated layer, at the time when, before or after irradiating UV-rays, the setting time can be saved.

In the invention, a UV-setting protective layer is formed directly on the surface of an image-receiving layer with a transferred image formed thereon.

(6) Writing layer

The aforementioned writing layer is a layer arranged to the backside of an ID card so as to be able to write on the layer. The writing layer may be formed of such a "writing layer" as described in, for example, JP OPI Publication No. 1-205155/1989. The writing layer is arranged to one support side where plural layers are not laminated.

Preparation of ID card

An ID card relating to the invention may be prepared in the following manner. As described above, the image-receiving layer of the ID card and an ink layer of an ink sheet for sublimable type thermosensitive image-recording use are laid one on top of another, and heat is applied imagewise thereto from a heat source such as a thermal head. Thereby a thermally diffusible type dye is diffused to transfer to the image-receiving layer, so that a contrast gradation information-containing image can be formed. Next, on the surface of the image-receiving layer, on which the contrast gradation information-containing image is not formed, various kinds of letters are heat-transferred in a sublimable type thermosensitive image-transfer recording system wherein an ink sheet for sublimable type thermosensitive image-transfer recording is used, or in a thermofusible type thermosensitive image-transfer recording system wherein a thermofusible type ink sheet is used. As described above, a transparent protective layer is formed on the surface of the image-receiving layer formed thereon with a contrast gradation information-containing image, in a coating process, a hot-stamp process wherein a transparent sheet is used, or other process. Thereafter, a UV-setting type resin is coated over the whole image-receiving layer and a UV-setting protective layer can be formed by irradiating ultraviolet rays.

The resulting ID card is suitable for mass-production. Because the adhesive property of the hard UV-protective layer formed on the surface of the ID card can be excellent, even in a long time use, the durability thereof can be excellent without peeling off the UV-setting protective layer and, at the same time, a formed transferred image can be protected for a long time so that an important personal information can securely be stored.

Now, the examples of the invention will concretely be detailed below. In the following descriptions, the term, "a part" or "part s", means "a part by weight" or "parts by weight".

EXAMPLE 1

Preparation of Support

A 450 μm-thick wide composite resin sheet was prepared by thermally fusing a 50 μm-thick white polypropylene resin sheet (Noblene FL25HA manufactured by Mitsubishi Oil-Chemical Co., Ltd.) to coat on the both sides of a 350 μm-thick polyethylene terephthalate resin sheet (Merrinex 226 manufactured by ICI). On one side of the resulting composite resin sheet, a corona-discharge was applied with 25 W/(m².min) and, at the same time, each of the following layers was laminated on the sheet serving as a support.

Formation of Intermediate layer

An intermediate layer coating solution having the following composition was coated on the surface of the corona-discharged support and then dried up, so that a 0.5 μm-thick intermediate layer was formed.

| <Coating solution for forming an intermediate layer> | |
| --- | --- |
| Polyvinyl butyral (Eslec BX-1, manufactured by Sekisui | 9 parts |

-continued

<Coating solution for forming an intermediate layer>

| | |
|---|---|
| Chemical Ind. Co.) | |
| Isocyanate | 1 part |
| (Colonate HX, manufactured by | |
| Nippon Polyurethane Co.) | |
| Methyl ethyl ketone | 80 parts |
| Cyclohexanone | 10 parts |

Formation of Writing Layer

On the surface of the support opposite to the image-receiving layer, a coating solution for forming a writing layer having the following composition and then dried up, so that a 40 μm-thick writing layer was formed.

<The coating solution for forming the first image-receiving layer>

| | |
|---|---|
| Polyvinyl butyral resin | 6 parts |
| (Eslec BX-1, manufactured by Sekisui | |
| Chemical Ind. Co., Ltd.) | |
| A metal ion-containing compound, | 4 parts |
| (Compound MS-17 represented by | |
| the following chemical formula) | |
| Methyl ethyl ketone | 90 parts |

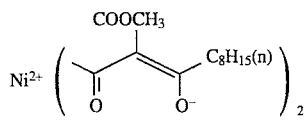

<Coating solution for forming the second image-receiving layer>

| | |
|---|---|
| Polyethylene wax emulsion | 2 parts |
| (Hi-Tec E-11000, manufactured by | |
| Toho Chemical Ind. Co.) | |
| Urethane-modified ethylene acrylic | 8 parts |
| acid polymer emulsion | |
| (S-6254, manufactured by | |
| Toho Chemical Ind. Co.) | |
| Methyl ethyl ketone | 90 parts |

Formation of Writing Layer

On the surface of the support opposite to the image-receiving layer, a coating solution for forming a writing layer having the following composition and then dried up, so that a 40 μm-thick writing layer was formed.

<Coating solution for forming a writing layer>

| | |
|---|---|
| Colloidal silica | 2.5 parts |
| Gelatin | 7.0 parts |
| A layer hardener | 0.2 parts |
| (the compound represented by | |
| the following chemical formula) | |
| Water | 90.0 parts |

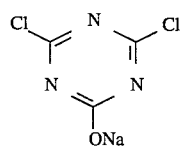

An ink sheet for thermodiffusible image-transfer recording use was prepared in the following manner.

On the corona-discharged surface of a 6 μm-thick polyethylene terephthalate sheet serving as a support, the three kinds of coating solutions for forming three kinds of ink layers were coated so that the after-dried thickness could be 1 μm and that yellow (Y), magenta (M) and cyan (C) could be separately coated along the longitudinal direction of the polyethylene terephthalate sheet, and was then dried up. At the same time of the drying treatment, one or two drops of silicone oil (X-41, 403A, manufactured by Shin-Etsu Silicone Co.) were dropped from a pipett to the rear side of the support where no corona-discharged treatment was made. The silicone oil drops were spread over the whole rear side of the support, and a back-coating treatment was then made, so that three colored (in Y, M and C) ink sheet for thermal image-transfer recording use could be prepared.

<Coating solution for forming a Yellow ink layer>

| | |
|---|---|
| Yellow dispersible dye | 3 parts |
| (MS Yellow, manufactured by | |
| Mitsui-Toatsu Dye Co.) | |
| Polyvinyl butyral | 5 parts |
| (BX-1 having a polymerization degree: | |
| 1700, a Tg: 85.5° C., an acetalization | |
| degree: 64 mol %, an acetyl group | |
| content: not more than 3 mol %, | |
| manufactured by Sekisui Chemical | |
| Inc. Co.) | |
| Polyester-modified silicone | 0.4 parts |
| (X-24-8310, manufactured by Shin- | |
| Etsu Chemical Ind. Co.) | |
| Toluene | 40 parts |
| Methyl ethyl ketone | 40 parts |
| Dioxane | 10 parts |

<Coating solution for forming a magenta ink layer>

| | |
|---|---|
| Magenta diffusible dye, | 5 parts |
| (MS Magenta, manufactured by | |
| Mitsui-Toatsu Dye Co.) | |
| Polyvinyl butyral, | 5 parts |
| (BX-1 having a polymerization degree: | |
| 1700, a Tg: 85.5° C., an acetalization | |
| degree: 64 mol %, an acetyl group | |
| content: not more than 3 mol %; | |
| manufactured by Sekisui Chemical | |
| Ind. Co.) | |
| Polyester-modified silicone, | 0.4 parts |
| (X-24-8310, manufactured by | |
| Shin-Etsu Chemical Ind. Co.) | |
| Toluene | 40 parts |
| Methyl ethyl ketone | 40 parts |

<Coating solution for forming a cyan ink layer>

| | |
|---|---|
| Cyan diffusible dye, | 4 parts |
| (Kayaset Blue 136, manufactured | |
| by Nihon Kayaku Co.) | |
| Polvinyl butyral, | 5 parts |
| (BX-1 having a polymerization | |
| degree: 1700, an acetalization | |
| degree: 64 mol %, an acetyl group | |
| content: not more than 3 mol %; | |
| manufactured by Sekisui Chemical | |
| Ind. Co.) | |
| Polyester-modified silicone, | 0.4 parts |
| (X-24-8310, manufactured by | |
| Shin-Etsu Chemical Ind. Co.) | |
| Toluene | 40 parts |
| Methyl ethyl ketone | 40 parts |
| Dioxane | 10 parts |

(3) A thermofusible type ink sheet was prepared in the following manner. To be more concrete, on one side of the surfaces of a 4.5 μm-thick polyethylene terephthalate sheet, a coating solution for forming a thermofusible type ink layer was coated in a wire-bar process and was then dried up, so that a 1.2 μm-thick thermofusible type ink layer could be prepared.

On one side opposite to the thermofusible type ink layer of the polyethylene terephthalate sheet, a coating solution for forming an antisticking layer having the following composition, so that a 0.6 μm-thick antisticking layer could be prepared.

| <Composition of the coating solution for forming thermofusible type ink layer> | |
| --- | --- |
| Carnauba wax | 1 part |
| Ethylene-vinyl acetate copolymer, (EV 40Y manufactured by Mitsui-DuPont Chemical Co.) | 1 part |
| Carbon black | 6 parts |
| Phenol resin, (Tamanol 521, manufactured by Arakawa Chemical Co.) | 12 parts |
| Methyl ethyl ketone | 80 parts |
| Coating agent for antisticking layer use | |
| Nitrocellulose | 3 parts |
| Acrylsilicone resin | 7 parts |
| Methyl ethyl ketone | 90 parts |

Formation of Transferred Image

A laminate for the above-mentioned ID card use comprising a support bearing thereon an intermediate layer, an image-receiving layer and a writing layer is cut into a card size specified in JIS standards. The image-receiving layer of the resulting laminate for ID card and a sublimable type dye of an ink sheet for thermally image-transferring use were laid one on top of another, and were then heated, from the side of the ink sheet for sublimable type thermal image-transfer recording use, by making use of a thermal head, and under the conditions of an output of 0.23 W/dot, a pulse duration within the range of 0.3 to 4.5 msec and a dot density of 16 dot/mm. Thereby, a portrait image of a certain person having a contrast gradation was formed on the image-receiving layer. Successively, a transparent protective layer was transferred to the image-receiving layer of the image-receiving sheet in the following manner so that the transparent protective layer could be positioned on the surface of the portrait image and that the transparent protective layer could be slightly larger than the portrait image.

Transparent Protective Layer

On the resulting image-receiving layer, a coating solution for making a transparent protective layer adhered and a coating solution for forming transparent protective layer A were each coated in this order in a wire-bar coating process so that the dried thicknesses thereof could be 2 μm and 0.3 μm, and were then dried up, respectively. Resultingly, transparent protective layer A could be formed.

| <Coating solution for making a transparent protective layer adhered> | |
| --- | --- |
| Maleic acid-modified ethylene vinyl acetic acid anhydride, (VR-103 manufactured by Toyo-Morton Co., Ltd.) | 10 parts |
| Acrylic resin (Dianar BR-87 manufactured by Mitsubishi Rayon Co.) | 5 parts |
| Styrene-PMMA graft polymer, (RESEDAGP-200 manufactured by Toa Synthetic Chemical Ind. Co.) | 5 parts |
| Methyl ethyl ketone | 80 parts |

| <Coating solution for forming transparent protective layer> | |
| --- | --- |
| Polyvinyl butyral, (Eslec BX-1 manufactured by Sekisui Chemical Ind. Co.) | 4 parts |
| Ethyl cellulose, (N-type manufactured by Hercules Co.) | 60 parts |
| Methyl ethyl ketone | 90 parts |

UV-setting Protective Layer

A coating solution for forming a UV-setting protective layer having the following composition was prepared.

| <Coating solution for forming a UV-setting protective layer> | |
| --- | --- |
| Side-chained type bisphenol A glycidyl ether | 15 parts |
| 3,4-epoxycyclohexylmethyl-3,4-epoxycyclohexane carboxylate | 70 parts |
| Trimethylol propane triglycidyl ether | 15 parts |
| An aromatic sulfonium salt type UV initiator | 6 parts |

Next, On both of the surfaces of the transparent protective layer and other layers than the transparent protective layer, a coating solution for forming a UV-setting protective layer was coated by a gravure-roll coater having a specific background pattern so that the amount thereof coated could be 15 g/m$^2$, and a coating material for forming a UV-setting protective layer was hardened, so that the UV-setting protective layer could be formed.

| Hardening conditions: | |
| --- | --- |
| Light irradiation source | A 60 W/cm$^2$ high-pressure mercury-vapor lamp |
| Irradiation distance | 10 cm |
| Irradiation mode | Optical scanning at 3 cm/min. |

The resulting ID card was evaluated as follows. The results thereof will be shown in Table 1.

<<Evaluation>>

Critical surface tension

As described in "Polymer Surface Chemistry", pp. 19–22, Sangyo Tosho Book Co., when dropping various liquids each having a different surface tension to the surface of the formed image-receiving layer or transparent protective layer, the contact angle tests were tried by making use of a goniometer type contact angle measuring instrument (manufactured by Elmer Optical Co.). A graph of surface tension ($\gamma_L$)-cosΘ was made out so that a linear relation could be obtained. The result of the linear relation was extrapolated to cosΘ=1, so that the critical surface tension ($\gamma_C$) could be obtained, that is, concretely, it was expressed by the liquid surface tension obtained when Θ was 0. As for the liquid having a different surface tension, a mixed liquid of ethanol and water was used.

Adhesive property

Bending Test

By making use of a Scott type nipping tester in conformity with JIS K 6772, a sample having a size of 80 mm in length×30 mm in width was subjected to a bending test 500 times under the conditions of a bending cycle of 120 times/min., a bending stroke of 50 mm, a nipping distance of 10 mm, a freely-opened nipping width of 3.0 mm and an ordinary temperature, and the properties of adhesion, peeling-off, cracking and bending each of the UV-setting protective layer were evaluated with the eye in terms of the following criteria.

◯ . . . No abnormality found,

△ . . . A few abnormalities found, and

× . . . Abnormalities found

Peeling off of Tape a. To the surface of the hardened UV-setting protective layer, a cellophane adhesive tape (manufactured by Nichiban Co. ) was firmly pasted and after rapidly peeling off the tape from the protective layer surface, the peeled off state was observed.

b. According to the procedures of a cross-cut adhesive tape specified in JIS K 5400, the surface of the hardened protective layer was cut at an angle of 30° by a sharp cutlery such as a knife so as to make 100 (10 by 10) cross cuts reaching the base member of the protective layer and having each side size of 1 mm or 1.5 mm. Then, the numbers of the cross-cuts on the coated layer remaining unpeeled off were measured. When the coated layer was excellent in adhesive property on the whole, cross-cuts were made and then a cellophane adhesive tape was pasted on the cross-cuts. Thereafter, the tape was peeled off, and the positions in the direction of the thickness of the peeled cross-cuts and the numbers of the peeled cross-cuts were measured and evaluated. The evaluation thereof were carried out according to the following point-basis evaluation.

10 points . . . Every line of cuts were fine and smooth at the both ends of the cuts, and no peeling was found at the intersection of cuts and on every square cut side;

8 points . . . Slight peelings were found at the intersection of cuts without any peeling on every square cut side, and the defect area was not more than 5% of the whole square area;

6 points . . . Peeling off were found at the both ends of the cuts and at the intersection thereof, and the defect area was not more than 5% to 15% of the whole square area;

4 points . . . The cut peeling off was wide and the defect area was within the range of 15 to 35% of the whole square area;

2 points . . . The cut peeling off was wider than that evaluated by 4 points and the defect area was within the range of 35 to 65% of the whole square area; and 0 point . . . The peeled off area was not less than 65% of the whole square area.

c. A sample having a hardened UV-setting protective layer was dipped in city water at 20° C. for a whole day and night, and the adhesive property to an image was checked up in the same manner as in the above paragraph b.

COMPARATIVE EXAMPLE 1

An ID card was prepared in the same manner as in Example 1, except that the coating solution for forming transparent protective layer A in Example 1 was replaced by a coating solution comprising 100 parts by weight of polystyrene (Idemitsu Styrol GP US-300 manufactured by Idemitsu Petrochemical Co.). The resulting ID card was evaluated in the same manner as in Example 1, and the results thereof will be shown in Table 1.

EXAMPLE 2

An ID card was prepared in the same manner as in Example 1, except that the composition of the coating solution for forming transparent protective layer A in Example 1 was replaced by the following composition. The resulting ID card was evaluated in the same manner as in Example 1, and the results thereof will be shown in Table 1.

| Coating solution for forming transparent protective layer A | |
|---|---|
| Polyvinyl acetacetal, (Eslec KS-1 manufactured by Sekisui Chemical Ind. Co.) | 5 parts |
| Ethyl cellulose, (N type manufactured by Hercules Co.) | 5 parts |
| Methyl ethyl ketone | 90 parts |

EXAMPLE 3

An ID card was prepared in the same manner as in Example 1, except that a UV-setting protective layer was formed directly on the surface of an image-receiving layer without forming any transparent protective layer of Example 1. The resulting ID card was evaluated in the same manner as in Example 1. The results thereof will be shown in Table 1.

EXAMPLE 4

An ID card was prepared in the same manner as in Example 2, except that the composition of the coating solution for forming the UV-setting protective layer used in Example 2 was replaced by the following composition. The resulting ID card was evaluated in the same manner as in Example 1, and the results thereof will be shown in Table 1.

| Coating solution for forming UV-setting protective layer | |
|---|---|
| Pentaerythritol triacrylate | 21 parts |
| Pentaerythritol tetracrylate | 9 parts |
| Urethane acrylate, (Unidic 17-849 manufactured by Dai-Nippon Ink Ind. Co.) | 70 parts |
| Benzoin ethyl ether | 5 parts |

EXAMPLE 5

An ID card was prepared in the same manner as in Example 1, except that the composition of the coating solution for forming transparent protective layer A of Example 1 was replaced by the following composition. The resulting ID card was evaluated in the same manner as in Example 1, and the results thereof will be shown in Table 1.

| Coating solution for forming transparent protective layer A | |
|---|---|
| Polyester resin, (Bylon-300 manufactured by Toyobo Corp.) | 10 parts |
| Methyl ethyl ketone | 90 parts |

EXAMPLE 6

An ID card was prepared in the same manner as in Example 1, except that the composition of the coating solution for forming transparent protective layer A used in Example 1 was replaced by the following composition. The resulting ID card was evaluated in the same manner as in Example 1, and the results thereof will be shown in Table 1.

| Coating solution for forming transparent protective layer | |
|---|---|
| Polyvinyl acetacetal, (Eslec KS-1 manufactured by Sekisui Chemical Ind. Co.) | 2 parts |
| Poly(acrylonitrile-butadiene) resin, (Hi-car 1002 manufactured by Goodyear Co.) | 8 parts |
| Methyl ethyl ketone | 70 parts |
| n-butyl acetate | 20 parts |

EXAMPLE 7

An ID card was prepared in the same manner as in Example 1, except that the composition of the coating solution for forming the second image-receiving layer used in Example 1 was replaced by the following composition. The resulting ID card was evaluated in the same manner as in Example 1, and the results thereof will be shown in Table 1.

| Coating solution for forming the second image-receiving layer | |
|---|---|
| Saturated polyester resin, (K 1294 manufactured by Toray, Inc.) | 4 parts |
| Poly(acrylonitrile-butadiene) resin, (Hi-car 1002 manufactured by Goodyear Co.) | 5 parts |
| Polyethylene wax emulsion, (Hi-tec E-11000 manufactured by Toho chemical Ind. Co.) | 1 part |
| Methyl ethyl ketone | 90 parts |

EXAMPLE 8

An ID card was prepared in the same manner as in Example 1, except that the composition of the coating solution for forming the second image-receiving layer used in Example 1 was replaced by the following composition and that the coating solution for forming the UV-setting protective layer was replaced by the coating solution for forming the UV-setting protective layer described in Example 2. The resulting ID card was evaluated in the same manner as in Example 1, and the results thereof will be shown in Table 1.

| Coating solution for forming the second image-receiving layer | |
|---|---|
| Polyester resin, (Bylon 300 manufactured by Toyobo, Inc.) | 10 parts |
| Methyl ethyl ketone | 70 parts |
| Toluene | 20 parts |

COMPARATIVE EXAMPLE 2

An ID card was prepared in the same manner as in Example 1, except that the composition of the coating solution for forming the second image-receiving layer used in Example was replaced by the following composition, and that a UV-setting protective layer similar to that used in Example 1 was formed directly on the surface of the image-receiving layer without forming any transparent protective layer. The resulting ID card was evaluated in the same manner as in Example 1, and the results thereof will be shown in Table 1.

| Coating solution for forming the second image-receiving layer | |
|---|---|
| Polyethylene wax emulsion, (Hi-tec E-11000 manufactured by Toho Chemical Ind. Co.) | 10 parts |
| Methyl ethyl ketone | 90 parts |

COMPARATIVE EXAMPLE 3

An ID card was prepared in the same manner as in Example 1, except that the composition of the coating solution for forming the transparent protective layer A used in Example 1 was replaced by the following composition. The resulting ID card was evaluated in the same manner as in Example 1, and the results thereof will be shown in Table 1.

| Coating solution for forming transparent protective layer A | |
|---|---|
| Polypropylene, (MH-170 manufactured by Tokuyama Soda Co.) | 5 parts |
| Polyvinyl butyral resin, (Eslec KS-1 manufactured by Sekisui Chemical Ind. Co.) | 5 parts |
| Methyl ethyl ketone | 90 parts |

COMPARATIVE EXAMPLE 4

An ID card was prepared in the same manner as in Example 1, except that the composition of the transparent protective layer A used in Example 1 was replaced by the following composition. The resulting ID card was evaluated in the same manner as in Example 1, and the results thereof will be shown in Table 1.

| Coating solution for forming transparent protective layer A | |
|---|---|
| Poly(acrylonitrile-butadiene) resin (Hi-car 1002 manufactured by Goodyear Co.) | 10 parts |
| Methyl ethyl ketone | 70 parts |
| Toluene | 20 parts |

COMPARATIVE EXAMPLE 5

An ID card was prepared in the same manner as in Example 1, except that the composition of the coating solution for forming transparent protective layer A used in Example 1 was replaced by the following composition. The resulting ID card was evaluated in the same manner as in Example 1, and the results thereof will be shown in Table 1.

| Coating solution for forming transparent protective layer A | |
|---|---|
| Phenol resin, Poly(octylphenol-formalin), (PP-5120 having a melting point of 80–100° C., manufactured by Gun-Ei Chemical Co.) | 10 parts |
| Methyl ethyl ketone | 70 parts |
| n-butyl acetate | 20 parts |

COMPARATIVE EXAMPLE 6

An ID card was prepared in the same manner as in Example 1, except that the composition of the coating solution for forming the second image-receiving layer used in Example 1 was replaced by the following composition, and the composition of the coating solution for forming the transparent protective layer used in Example 1 was replaced with that of Comparative example 3. The resulting ID card was evaluated in the same manner as in Example 1, and the results thereof will be shown in Table 1.

| Coating solution for forming the second image-receiving layer | |
|---|---|
| Phenol resin, poly(octyl phenol-formalin), (PP-5120 having a melting point of 80–100° C., manufactured by Gun-Ei Chemical Co.) | 10 parts |
| Methyl ethyl ketone | 80 parts |
| Toluene | 10 parts |

COMPARATIVE EXAMPLE 8

An ID card was prepared in the same manner as in Comparative example 7, except that a UV-setting protective layer similar to that of Example 1 was formed directly on the surface of the image-receiving layer without forming any transparent protective layer. The resulting ID card was evaluated in the same manner as in Example 1, and the results thereof will be shown in Table 1.

COMPARATIVE EXAMPLE 8

An ID card was prepared in the same manner as in Comparative example 2, except that the composition of the UV-setting protective layer used in Comparative example 7 was replaced by that used in Example 4. The resulting ID card was evaluated in the same manner as in Example 1, and the results thereof will be shown in Table 1.

TABLE 1

| | Image-receiving layer | | Transparent protective layer | | Resin for forming UV-setting protective layer | Bending test adhesive property | Adhesive property | | |
|---|---|---|---|---|---|---|---|---|---|
| | 2nd image-receiving layer formation Substance and quantity rate | Critical surface tension (dyne/cm) | Transparent protective layer formation Substance and quantity rate | Critical surface tension (dyne/cm) | | | Before dipping in water | | After dipping in water |
| | | | | | | | *(a) | *(b) | *(c) |
| Example 1 | I-8:J-2 | 39 | A-4:B-6 | 38 | Epoxy type | ○ | 10 | 6 | 6 |
| Example 2 | I-8:J-2 | 39 | B-5:D-5 | 40 | Epoxy type | ○ | 10 | 10 | 10 |
| Example 3 | I-8:J-2 | 39 | — | — | Epoxy type | Δ | 10 | 6 | 6 |
| Example 4 | I-8:J-2 | 39 | B-5:D-5 | 40 | Acryl type | Δ | 10 | 6 | 4 |
| Example 5 | I-8:J-2 | 39 | E-10 | 43 | Epoxy type | ○ | 10 | 8 | 8 |
| Example 6 | I-8:J-2 | 39 | D-2:F-8 | 48 | Epoxy type | Δ | 10 | 8 | 7 |
| Example 7 | G-4:F-5:J-1 | 48 | A-4:B-6 | 38 | Epoxy type | ○ | 10 | 7 | 7 |
| Example 8 | E-10 | 43 | B-5:D-5 | 40 | Epoxy type | ○ | 10 | 10 | 9 |
| Comparative example 1 | I-8:J-2 | 39 | C-10 | 32 | Epoxy type | X | 4 | 2 | 2 |
| Comparative example 2 | J-10 | 25 | — | — | Epoxy type | X | 4 | 0 | 0 |
| Comparative example 3 | I-8:J-2 | 39 | K-5:L-5 | 26 | Epoxy type | X | 5 | 4 | 4 |
| Comparative example 4 | I-8:J-2 | 39 | F-10 | 52 | Epoxy type | X | 6 | 4 | 0 |
| Comparative example 5 | I-8:J-2 | 39 | H-10 | 53 | Epoxy type | X | 4 | 0 | 0 |
| Comparative example 6 | H-10 | 53 | K-5:L-5 | 26 | Epoxy type | X | 6 | 0 | 0 |
| Comparative example 7 | H-10 | 53 | — | — | Epoxy type | X | 5 | 2 | 0 |
| Comparative example 8 | H-10 | 53 | — | — | Acryl type | X | 0 | 0 | 0 |

A: Polyvinyl butyral (Eslec BX-1 made by Sekisui Chemical Ind. Co.)
B: Ethyl cellulose (N type made by Hercules Co.)
C: Polystyrene (Idemitsu styrol GP US-300 made by Idemitsu Petrochemical Co.)
D: Polyvinyl acetacetal (Eslec KS-1 made by Sekisui Chemical Ind. Co.)
E: Polyester (Bylon-300 manufactured by Toyobo Corp.)
F: Poly(acrylonitrile-butadiene) (Hi-car 1002 made by Goodyear Co.)
G: Saturated polyester (K-1294 made by Toray Corp.)
H: Poly(octylphenol-formalin) (PP-5120 with a melting point of 80–100° C., made by Gun-Ei Chemical Co.)
I: Urethane-modified ethylene acrylic polymer emulsion (S-6254 made by Toho Chemical Ind. Co.)
J: Polyethylene wax emulsion (Hi-Tec E-11000 made by Toho chemical Ind. Co.)
K: Polypropylene (MH-170 made by Tokuyama Soda Co.)
L: Polyvinyl butyral (Eslec KS-1 made by Sekisui Chemical Ind. Co.)
*The evaluation procedures of (a), (b) and (c) were in conformity with the evaluation procedures of the adhesive property.

What is claimed is:

1. An ID card, comprising:

a support, and provided thereon, an image receiving layer and a UV hardening resin layer in this order;

said ID card optionally containing a transparent layer interposed between the image-receiving layer and said UV hardening resin layer, wherein said transparent layer comprises a transparent layer forming substance in an amount of 10 to 90% by weight, and wherein, when said UV hardening resin layer is directly adhered to a surface of said image receiving layer, a critical surface tension of said surface of said image receiving layer is 34 to 50 dyne/cm, and wherein, when said transparent layer is interposed between said image-receiving layer and said UV hardening resin layer and said UV hardening resin layer is directly adhered to a surface of said transparent layer, a critical surface tension of said surface of said transparent layer is 34 to 50 dyne/cm.

2. The ID card of claim 1, wherein said critical surface tension is within the range of 37 to 44 dyne/cm.

3. The ID card of claim 1, wherein said image-receiving layer comprises a two-coordination chelate formed by reaction of a metal ion-containing compound and a dye represented by Formula I:

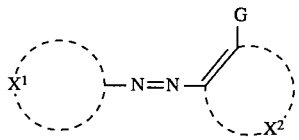

wherein $X^1$ represents an aromatic carbon ring of which at least one ring is constituted of 5 to 7 atoms, or a group consisting of atoms necessary to complete a heterocyclic ring, and in which an atom, that is positioned in at least one position adjacent to the position of a carbon atom capable of coupling to an azo bond, is a nitrogen atom or a carbon atom substituted with a chelating group; $X^2$ represents an aromatic heterocyclic ring of which at least one ring is constituted of 5 to 7 atoms or an aromatic carbon ring; and G represents a chelating group.

4. The ID card of claim 5, wherein said metal of the metal ion containing compound, is Al, Co, Cr, Cu, Fe, Mg, Mn, Mo, Ni, Sn, Ti or Zn.

5. The ID card of claim 3, wherein said transparent layer is interposed between said image-receiving layer and said UV hardening resin layer.

6. The ID card of claim 5, wherein said transparent protective layer comprises a polyvinyl acetal resin.

7. The ID card of claim 5, wherein said transparent layer has a thickness within the range of 0.5 to 20 μm.

8. The ID card of claim 1, wherein said support has a thickness of 100 to 1000 μm.

9. An ID card of claim 1, wherein said critical surface tension is within the range of 36 to 42 dyne/cm.

10. The ID card of claim 1, wherein said image-receiving layer has a thickness within the range of 1 to 20 μm.

11. The ID card of claim 10, wherein said image-receiving layer comprises a polyvinyl chloride, a copolymer of polyvinyl chloride, a polyester, polyvinyl acetal, a copolymer of styrene or an epoxy resin.

12. The ID card of claim 1 wherein said UV hardening resin layer comprises a compound formed from a UV-hardenable prepolymer or monomer, each of which has at least two epoxy groups per one molecule.

13. The ID card of claim 1, further comprising an intermediate layer between said support and said image receiving layer.

* * * * *